(12) United States Patent
Altemare Jr. et al.

(10) Patent No.: US 6,862,507 B2
(45) Date of Patent: Mar. 1, 2005

(54) DISTRIBUTED STEERING BY WIRE CONTROL USING TIME-TRIGGERED PROTOCOL COMMUNICATION NETWORK

(75) Inventors: Clifford Altemare Jr., Livonia, MI (US); Bing Zheng, Dublin, OH (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 15 days.

(21) Appl. No.: 10/407,005

(22) Filed: Apr. 4, 2003

(65) Prior Publication Data

US 2004/0199315 A1 Oct. 7, 2004

(51) Int. Cl.$^7$ ................................................. B62D 5/04
(52) U.S. Cl. ........................................ 701/41; 180/443
(58) Field of Search ............................ 701/41, 42, 43; 180/443, 446

(56) References Cited

U.S. PATENT DOCUMENTS

| | | | | |
|---|---|---|---|---|
| 5,467,280 | A | | 11/1995 | Kimura ................. 364/424.05 |
| 6,003,959 | A | | 12/1999 | Katayose et al. ........... 303/146 |
| 6,027,183 | A | | 2/2000 | Katayose et al. ........... 303/146 |
| 6,349,996 | B1 | | 2/2002 | Heckmann et al. .... 303/122.04 |
| 6,424,900 | B2 | | 7/2002 | Murray et al. ................ 701/48 |
| 6,505,703 | B2 | * | 1/2003 | Stout et al. ................... 180/446 |
| 6,609,052 | B2 | * | 8/2003 | Radamis et al. .............. 701/41 |
| 6,640,173 | B1 | * | 10/2003 | Zheng .......................... 701/41 |
| 6,678,596 | B2 | * | 1/2004 | Husain et al. ................ 701/41 |
| 6,691,009 | B1 | * | 2/2004 | Yao et al. ...................... 701/41 |
| 6,694,239 | B1 | * | 2/2004 | Yao et al. ...................... 701/41 |
| 6,718,243 | B1 | * | 4/2004 | Yao et al. ...................... 701/42 |
| 2001/0029408 | A1 | | 10/2001 | Murray et al. ................. 701/1 |
| 2001/0032042 | A1 | | 10/2001 | Disser et al. ................. 701/48 |
| 2002/0026268 | A1 | * | 2/2002 | Millsap et al. ................ 701/41 |
| 2002/0033301 | A1 | | 3/2002 | Clephas ....................... 180/446 |
| 2002/0084757 | A1 | | 7/2002 | Ewbank et al. ............... 318/34 |
| 2002/0103939 | A1 | | 8/2002 | Fuehrer et al. ............. 709/248 |
| 2004/0039508 | A1 | * | 2/2004 | Husain et al. ................ 701/41 |
| 2004/0060765 | A1 | * | 4/2004 | Mattson et al. ............. 180/422 |

OTHER PUBLICATIONS

"An Advanced Steering Wheel Sensor", Asad M. Madni and Roger F. Wells, http://www.sensorsmag.com/articles/0200/28/main.shtml, printed on Dec. 23, 2002, pps. 1–13.
"Sensor Guides Electric Power Steering Into Mainstream", David Morrison, http://www.elecdesign.com/Globals/PlanetEE/Content/7900.html, printed on Dec. 23, 2002, pps. 1–2.

* cited by examiner

*Primary Examiner*—Gary Chin
(74) *Attorney, Agent, or Firm*—Brinks Hofer Gilson & Lione (57) ABSTRACT

The present invention involves a distributed control system for controlling a steering movement of a vehicle. The system includes a driver interface assembly, a driver interface node having a first time-triggered protocol (TTP) processing system and a road wheel node having a second time-triggered protocol (TTP) processing system. The driver interface node having a first time-triggered protocol (TTP) processing system is coupled to the driver interface assembly, where the driver interface node receives steering wheel parameters from the driver interface assembly. The road wheel node having the second time triggered protocol (TTP) processing system is coupled to the driver interface node, where the road wheel node transmits sensor measurements from a vehicle to the driver interface node. The road wheel node generates an applied torque that adjusts a wheel of the vehicle.

22 Claims, 6 Drawing Sheets

| Host Slot us | Road Wheel Node 1 0 0 | Driver Interface Node 1 1 255 | Road Wheel Node 2 2 500 | Driver Interface Node 2 3 760 |
|---|---|---|---|---|
| Rnd 1 Ch. A | M1 M2 M4 / M3 M5 | M7 M8 M9 | M10 M11 M4 M6 / M3 M12 | M7 M9 |
| Ch. B us | M1 M2 M4 M6 / 0 M3 M5 | M7 M9 | M10 M11 M4 / M3 M5 | M7 M8 M9 |
| Rnd 2 Ch. A | | | | |
| Ch. B us | 1000 | | | |

FIG. 6

DISTRIBUTED STEERING BY WIRE CONTROL USING TIME-TRIGGERED PROTOCOL COMMUNICATION NETWORK

FIELD OF THE INVENTION

The present invention relates to an electronic architecture of a steering system for an automobile. More particularly, the present invention relates to a distributed control system using a time-triggered protocol (TTP) communication network to control a steering system for the vehicle.

BACKGROUND

Automobiles are used throughout the world to transport people to various destinations. These automobiles include steering systems that allow the drivers to steer the vehicles and dictate the direction the vehicle will travel. Typically, these steering systems have a mechanical link between the steering wheel and the road wheels.

There are several problems with the aforementioned steering systems. First, such steering systems may add unnecessary weight to the vehicle. Next, many such steering systems are contained in modular assemblies that are complex and difficult to test, which makes it difficult to correct problems that occur therein. Finally, such steering systems often cannot be flexibly placed in a vehicle, which makes it burdensome to install inside a vehicle and remove from the vehicle.

Accordingly, there is a need for a steering system that does not add unnecessary weight to a vehicle, has a simplified modular assembly and can be easily placed into the vehicle.

BRIEF SUMMARY

In one aspect of the present invention, there is a distributed control system for controlling a steering movement of a vehicle. The system includes a driver interface assembly, a driver interface node having a first time-triggered protocol (TTP) processing system and a road wheel node having a second time-triggered protocol (TTP) processing system. The driver interface node having the first time-triggered protocol (TTP) processing system is coupled to the driver interface assembly, where the driver interface node receives steering wheel parameters from the driver interface assembly. The road wheel node having the second time triggered protocol (TTP) processing system is coupled to the driver interface node, where the road wheel node transmits sensor measurements from a vehicle to the driver interface node. The road wheel node generates an applied torque that adjusts a wheel of the vehicle.

In another aspect of the present invention there is a distributed method for controlling the steering operation of a vehicle. Measurements from a driver interface assembly are received. Sensor measurements from a vehicle are received. The received measurements from the driver interface assembly and sensor measurements from the vehicle are combined in an applied torque equation to generate an applied torque. A wheel of the vehicle is adjusted based on the applied torque.

Each of the above aspects of the present invention provides the advantages of producing a steering system that does not add weight to a vehicle, has a simplified modular assembly and can be easily placed into the vehicle.

These and other advantages of the present invention will become more fully apparent as the following description is read in conjunction with the accompanying drawings.

DETAILED DESCRIPTION OF THE INVENTION

Figure 1:
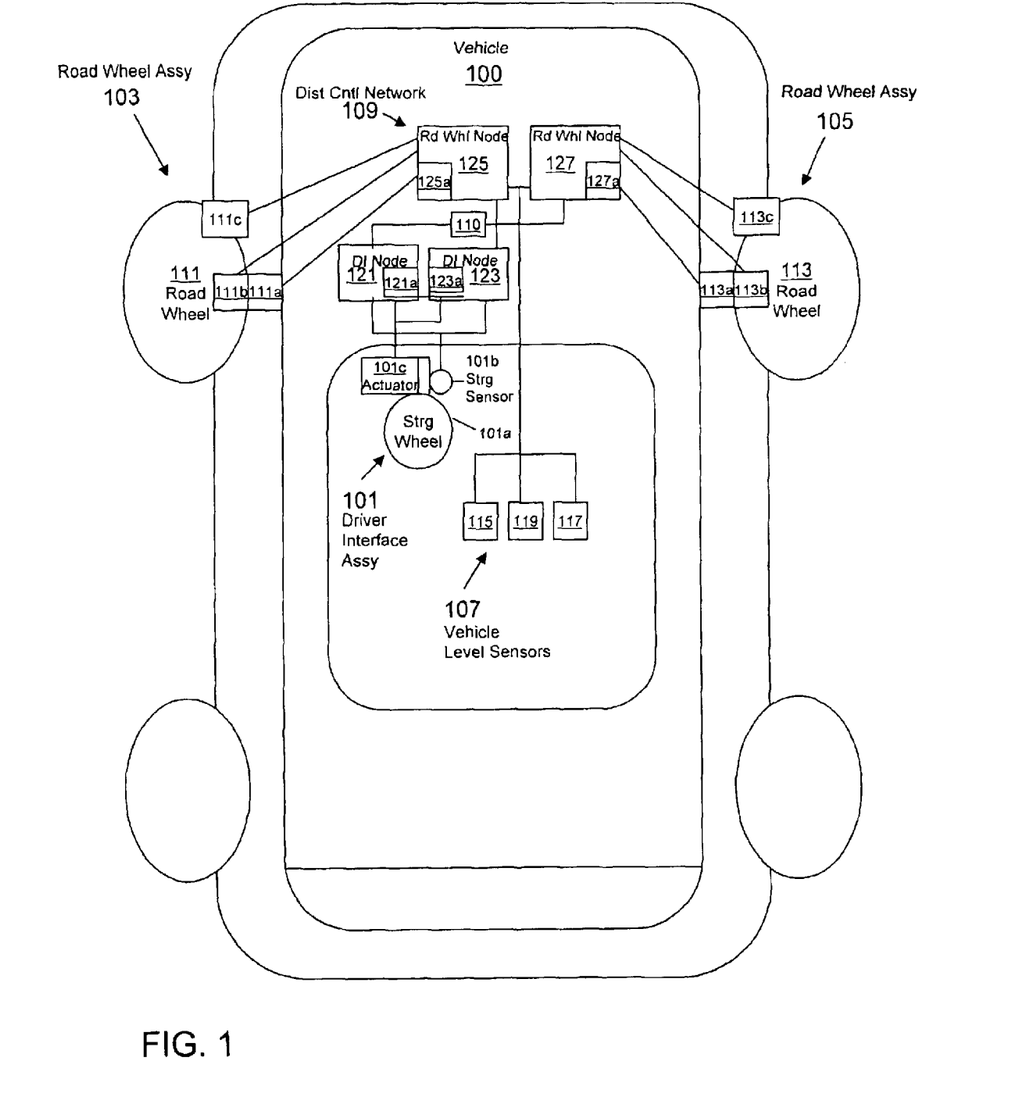
FIG. 1 illustrates a plan view of an embodiment of a vehicle including driver interface nodes and road wheel nodes in accord with the present invention.

As shown in FIG. 1, a vehicle 100 includes: a driver interface assembly 101, road wheel assembly 103 and road wheel assembly 105, vehicle level sensors 107 and a distributed control network 109. The driver interface assembly 101 includes a steering wheel 101a, at least one steering wheel sensor 101b, and an actuator 101c. The road wheel assemblies 103 and 105 include road wheels 111 and 113, actuators 111a and 113a and absolute wheel position sensors 111b and 113b. The vehicle level sensors 107 include a lateral acceleration sensor 115, a vehicle speed sensor 117, a yaw rate sensor 119 and two wheel speed sensors 111c and 113c. The distributed control network 109 includes two driver interface nodes 121 and 123, a time-triggered protocol (TTP) communication bus 110 and two road wheel nodes 125 and 127. These nodes 121,123, 125 and 127 contain power electronics 121a, 123a, 125a, 127a. These nodes are linked together by the TTP communication bus 110.

Driver interface nodes 121 and 123 contain the power electronics 121a and 123a coupled to actuator 101c. The driver interface nodes 121 and 123 are also coupled to the driver interface assembly 101 through the steering wheel sensor 101b. Road wheel nodes 125 and 127 contain the power electronics 125a and 127a and they are coupled to actuators 111a and 113a, absolute wheel position sensors 111b and 113b, lateral acceleration sensor 115, vehicle speed sensor 117, yaw rate sensor 119, and wheel speed sensors 111c and 113c. The actuators 111a and 113a are further coupled to the road wheels 111 and 113. In an alternative embodiment, the components of the vehicle 100 may be connected to each other in any suitable combination.

Turning to the basic operation of the vehicle 100, the steering wheel sensors 101b receives a measurement of steering wheel angle (intent of the driver) from steering wheel 101a. The intent of the driver is defined throughout as the steering wheel parameters, such as a steering wheel angle and a steering wheel rate, conveyed to the steering wheel 101a by the driver. Steering wheel sensor 101b through its connection with driver interface nodes 121 and 123 transmits measurements to these nodes. Driver interface nodes 121 and 123 also receive road wheel angles or positions, lateral acceleration and vehicle speed along with other vehicle measurements from the road wheel nodes 125 and 127 via the TTP communication network 110, which are referred to as measurements from the vehicle body 100. The driver interface nodes 121 and 123 receives these measurements, then converts the steering wheel angle component of the measurements to a road wheel actuator reference that is transmitted to the road wheel nodes 125 and 127 through the TTP communication bus 110. The steering wheel angle is converted to the road wheel actuator reference according to the following equation:

Road Wheel Actuator reference=steering wheel angle*steering ratio where steering wheel angle is from the steering wheel sensor 101b and steering ratio is a typical function of the vehicle speed from the road wheel nodes 125 and 127. This steering ratio can be constant or variable. The driver interface nodes 121 and 123 use these respective measurements from the road wheel nodes 125 and 127 along with the steering wheel angle measurement to generate a steering wheel feedback feel in the form of a reaction torque on the actuator 101c by using the following equations:

Reaction Torque=$k1$*(Steering wheel angle−Road wheel angle)+$k2$*lateral acceleration $k1=k5$*(vehicle speed+$kv2$)

$k2=k6$*(vehicle speed+$kv3$)

where kv2, kv3, k5 and k6 are unit scaling positive constant values known for each automobile, steering wheel angle is an angle measurement received from sensor 101b of the vehicle 100, road wheel nodes 125 and 127 provide the road wheel angle, vehicle speed and lateral acceleration measurements from the vehicle to the driver interface nodes 121 and 123. This reaction torque is necessary to provide steering wheel feedback feel due to the fact there is no mechanical link between the steering wheel 101a and the road wheels 111 and 113.

The values for k1 and k2, as shown above, are dependent on the vehicle speed and the steering wheel feedback feel defined by the vehicle system requirements from a customer.

The road wheel nodes 125 and 127 each receive their road wheel actuator reference via the TTP communication network 110 and combine it with measurements of road wheel angle from absolute wheel position sensors 111b and 113b, vehicle speed from vehicle speed sensor 117, lateral acceleration from lateral acceleration sensor 115, yaw rate from yaw rate sensor 119 and wheel rotation or speed measured by sensors 111c and 113c, which make up the overall status of the road wheel assemblies 103 and 105. In addition, road wheel nodes 125 and 127 receive measurements of actuator current, temperature and position from actuator sensors (not shown) at actuators 111a and 113a, where all of these measurements and the overall status of the road wheel assemblies are referred to as sensor measurements from the vehicle body 100. These sensor measurements are used to generate an applied torque to actuators 111a and 113a by using the following equations.

Applied Torque=$K$*(road wheel actuator reference−road wheel angle)

$K=k3$*(vehicle speed+$kv1$); if actuator temperature<actuator temperature threshold and actuator current<actuator current threshold, otherwise $K=k3$*(vehicle speed+$kv1$)*($k4$/max(|current|, |temperature|))

where k3, k4 & kv1 are unit scaling positive constants known for each automobile, where K is a function of vehicle speed, actuator current and actuator temperature received from actuators 111a and 113a at the road wheel nodes 125 and 127, where the actuator temperature threshold and actuator current threshold are values stored in the road wheel nodes 125 and 127.

Road wheel nodes 125 and 127 each use the applied torque to generate a known electrical pulse width modulated (PWM) signal that is transmitted to their power electronics 125a and 127a. Power electronics 125a and 127a receive this PWM signal and amplify this signal in both voltage and current to appropriately drive the actuators 111a and 113a. The PWM signal is used to control the average current used to drive actuators 111a and 113a, which, in turn, controls the torque and position of actuators 111a and 113a. This applied torque for each actuator, in turn, adjusts or controls movement of the road wheels 111 and 113 to match each road wheel actuator reference received from the driver interface nodes 121 and 123 based on feedback from either the relative actuator position sensor (not shown) at actuators 111a and 113a or the absolute wheel position sensors 111b and 113b.

Driver interface assembly 101 includes a steering wheel 101a that is equivalent to any type of steering wheel used for any vehicle and a steering wheel angle sensor 101b. In an alternative embodiment, steering wheel 101a may include a joystick or any other device along with a sensor to detect a desired change in movement of the joystick or any other device used to control the movement of wheels of a vehicle. In this embodiment, the driver interface assembly 101 includes a steering wheel 101a and the steering wheel angle sensor 101b. A driver uses the steering wheel 101a to control the movement of the wheels 111 and 113 of the vehicle 100.

Turning to sensor 101b, this sensor is equivalent to any type of steering wheel angle sensor used for a vehicle. Sensor 101b may include a plurality of sensors each having different technologies depending on the reliability needed. In an alternative embodiment, sensor 101b can be a low-end sensor, a high-end sensor, etc. Preferably, sensor 101b is an encoder-type sensor. Sensor 101b is used to sense and/or measure the intent of a driver controlling the steering wheel 101a. When the driver moves or rotates the steering wheel 101a of the steering wheel assembly 101, then sensor 101b detects the steering wheel angle and transmits this measurement to the driver interface nodes 121 and 123.

As mentioned previously, driver interface nodes 121 and 123 receive this measurement from the sensor 101b. The driver interface nodes 121 and 123 are also coupled to the actuator 101c where the actuator provides a reaction torque to the steering wheel 101a to generate steering wheel feedback feel. The algorithm used for generating reaction torque is a function of the difference between the steering wheel angle and the road wheel angle, lateral acceleration of the vehicle and speed of the vehicle. In addition, the algorithm is dependent on the original equipment manufacture (OEM) requirements. Further, a consumer can dynamically adjust the algorithm within the given stability boundary of the control system.

When the driver interface nodes 121 and 123 receive the steering wheel angle measurement, they each transmit a road wheel actuator reference through the time-triggered protocol (TTP) communication bus 110. TTP communication network 110 is a typical communication bus used with a TTP circuit. This communication bus is used to transmit and receive messages/signals between driver interface nodes 121 and 123 and road wheel nodes 125 and 127. The TTP communication protocol provides a real-time fault tolerant way of communicating information needed for distributed control from microcontrollers in the driver interface nodes 121 and 123 and road wheel nodes 125 and 127. If the TTP communication protocol was not available, it would be burdensome to figure out a way to synchronize and coordinate the driver interface nodes 121, and 123 and road wheel nodes 125 and 127 within this distributed control system 109.

The road wheel nodes 125 and 127 receive the road wheel actuator reference from the driver interface nodes 121 and 123. The road wheel nodes 125 and 127 contain the power electronics 125a and 127a that are coupled to actuators 111a and 113a. In addition, road wheel nodes 107 and 109 are coupled to wheel speed sensors 111c and 113c at each respective wheel 111 and 113 to detect or receive wheel speed information and the absolute road wheel position sensors 111b and 113b to receive absolute road wheel position. The road wheel nodes 125 and 127 are also coupled to the lateral acceleration sensor 115, the yaw rate sensor 119 located at the center of gravity of the vehicle 100 and the vehicle speed sensor 117. Lateral acceleration sensor 115 is a measurement of acceleration of vehicle 100 from side to side, which is typically evaluated at a rate of $9.81$ m/sec$^2$. Yaw rate is the rate at which vehicle 100 rotates about a z-axis. This z-axis goes through the top of vehicle 100 into the ground. Yaw rate is measured in degrees/per second.

Vehicle speed sensor 117 is a typical vehicle speed sensor that measures the speed of a vehicle in kilometers per hour, miles per hour or any appropriate measurement for vehicle speed. The measurements of the vehicle speed sensor 117, absolute road wheel position sensors 111b and 113b, actuator sensors (not shown), lateral acceleration sensor 115 and yaw rate sensor 1119 are combined with road wheel actuator reference to generate an electrical pulse width modulated (PWM) signal. This generated PWM signal is sent to power electronics 125a and 127a, which utilize the signal to drive or control the movement of actuators 111a and 113a. These power electronics 125a and 127a include the typical components utilized to drive an actuator. Preferably, power electronics 125a and 127a are solid-state transistors. These solid-state transistors receive the PWM signal, and amplify this signal in both voltage and current to drive the actuators 111a and 113a.

Actuators 111a and 113a receive the amplified signal from power electronics 125a and 127a to move the wheels 111 and 113. The actuators 111a and 113a are typical actuators used in vehicles. For example, actuators 111a and 113a move the wheels in the same manner as the typical steering rack steers vehicles. Alternatively, the actuators may be any type of device used to control the movement of wheels in a vehicle. Preferably, the actuators 111a and 113a are DC brushless motors.

Figure 2:
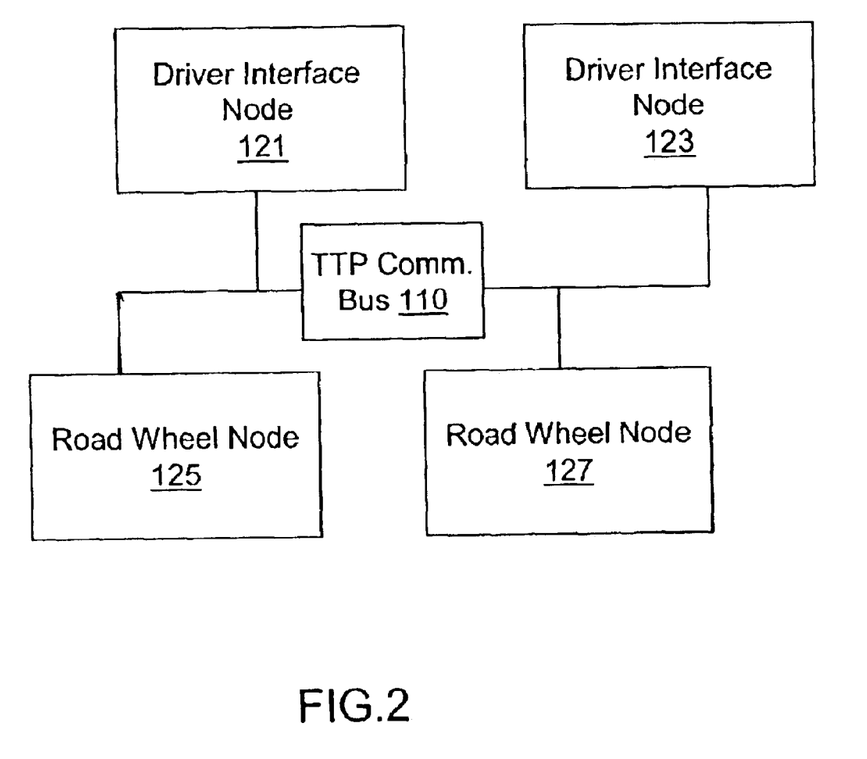
FIG. 2 schematically depicts an embodiment of a high level architecture of the driver interface nodes connected to the road wheel nodes of the vehicle of FIG. 1 in accord with the present invention.

As shown in FIG. 2, a high level architecture includes the driver interface nodes 121 and 123 coupled by the TTP communication bus or TTP communication network 110 to the road wheel nodes 125 and 127. The driver interface nodes 121 and 123 operate in the fault tolerant manner so if one driver interface node is not active, then the other driver interface node is active and able to receive the steering wheel angle measurement from sensor 101b and generate steering wheel feedback feel through actuator 101c. Turning to the road wheel nodes 125 and 127, they also operate in the fault tolerant manner so if one road wheel node is not active, then the other road wheel node is able to receive measurements of actuator current, actuator position, actuator temperature from the actuator sensors at actuators 111a and 113a, vehicle speed from vehicle speed sensor 117, wheel speed from wheel sensors 111c and 113c, lateral acceleration sensor 115 and yaw rate sensor 119 and steer the vehicle through the actuation of the other actuator.

Figure 3:
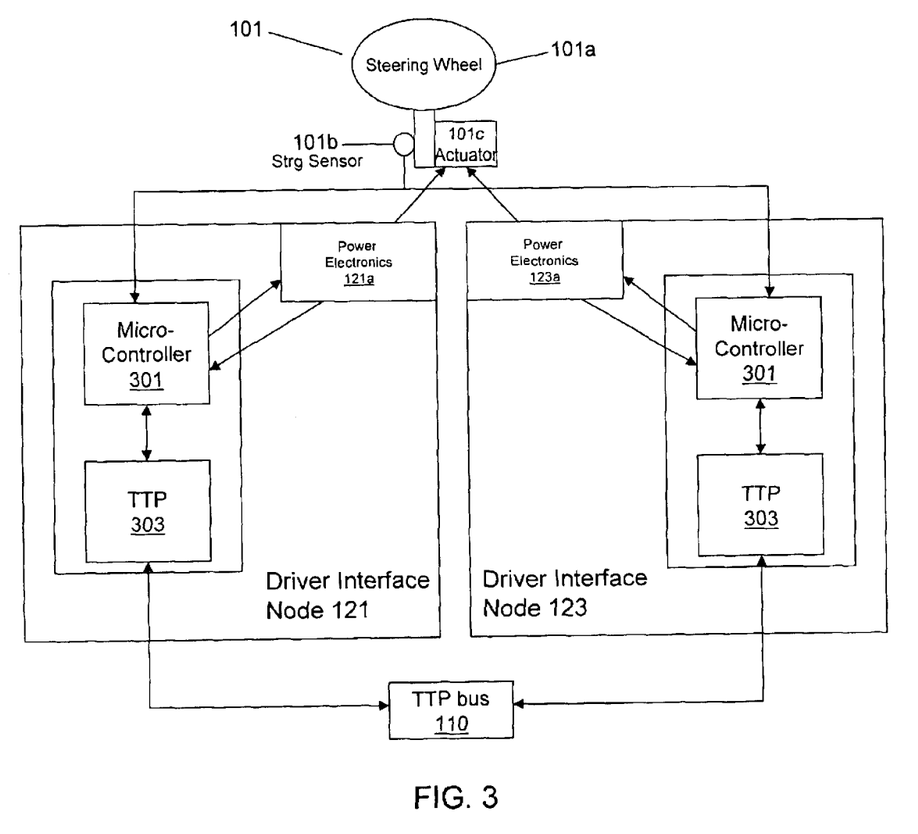
FIG. 3 is a schematic block diagram of an embodiment of driver interface nodes of the vehicle of FIG. 1 in accord with the present invention.

The interaction between steering wheel 101a, driver interface nodes 121 and 123 and actuator 101c is shown in FIG. 3. Each driver interface nodes 121 and 123 includes a microcontroller 301 coupled to a time-triggered protocol (TTP) chip 303 referred to as a first TTP processing system. The microcontroller 301 within the driver interface nodes 121 and 123 receive steering wheel angle information from sensor 101b. Microcontroller 301 processes these measurements and provides the steering wheel feedback in a reaction torque algorithm, described above, to generate a reaction torque. The reaction torque is generated in such a way that it takes into account the speed of the vehicle, the lateral acceleration of the vehicle and the yaw rate of the vehicle from sensors 117, 1115, and 119. In addition, the reaction torque takes into account road wheel parameters, as well as the parameters of speed of the steering wheel angle.

Turning to the many different forms of the microcontroller 301, the microcontroller 301 is an electrical device that is capable of interfacing with a time-triggered protocol (TTP) chip 303, a steering wheel angle sensor 101b and power electronics 121a or 123a. This hardware device can be a microprocessor, microcontroller or digital signal processor, having an electrically erasable program read only memory (EEPROM) or flash memory and static random access memory (RAM). The microcontroller includes a software algorithm that enables it to continuously monitor and read measurements from sensor 101b, generate a road wheel actuator reference and generate steering wheel feedback feel through actuator 101c.

Turning to TTP 303, it is a TDMA (time division multiple access) real-time fault tolerant communication protocol used for distributed control of safety-critical systems. This TTP has the ability to communicate over a network in a real-time fault tolerant manner. In addition, the TTP is a communication microchip or circuit that enables the driver interface nodes 121 and 123 to transmit information through the communication bus 110 to the road wheel nodes 125 and 127 and vice versa. The TTP chip 303 can be any typical time-triggered protocol chip. Preferably, the TTP chip 303 is from Austria Microsystems in Austria that has a manufacturer's product number of AS8202. TTP chip 303 receives the sensed signals/measurements and reaction torque from microcontroller 301, then TTP chip 303 transfers the torque and measurements through the TTP communication bus 110 to road wheel nodes 125 and 127.

Figure 4:
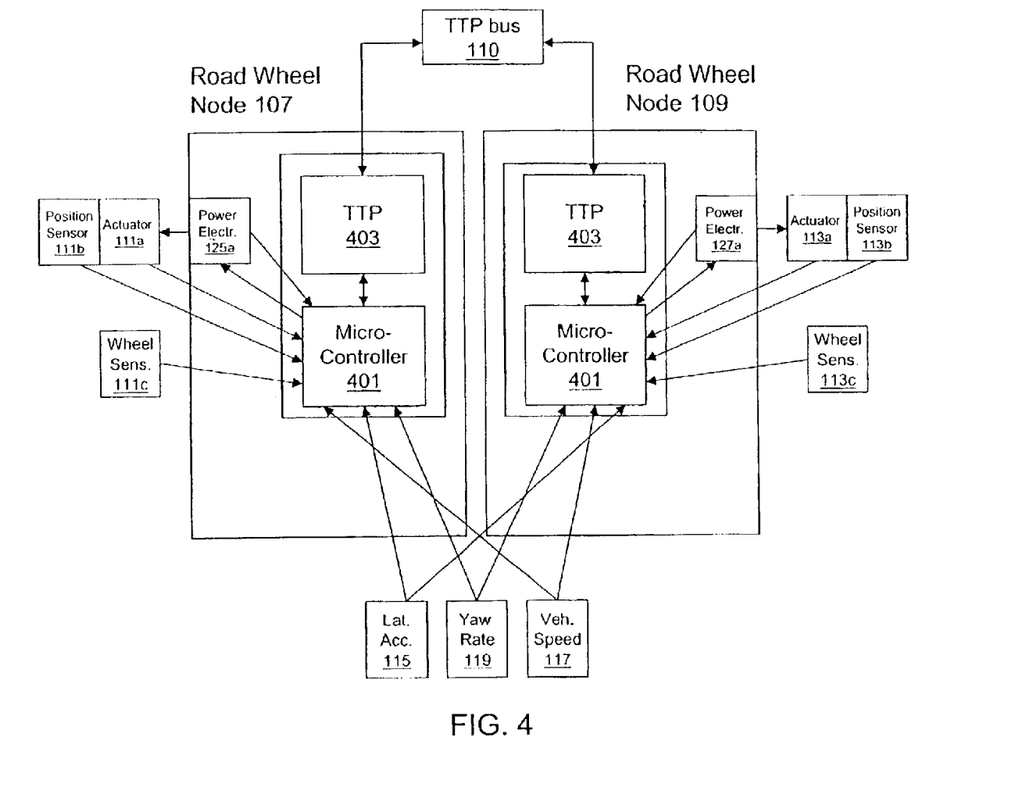
FIG. 4 is a schematic block diagram of the road wheel nodes of the vehicle of FIG. 1 in accord with the present invention.

The interaction between the road wheel nodes 125 and 127 and actuators 111a and 113a along with all of the sensor inputs is shown in FIG. 4. Each road wheel node 125 and 127 includes a microcontroller 401 coupled to a time-triggered protocol (TTP) chip 403 referred to as a second TTP processing system. The microcontroller 401 within the road wheel nodes 125 and 127 receive the road wheel actuator reference from the driver interface nodes 121 and 123 through the TTP communication bus 110 and combines this information with the vehicle level sensor 107 information from sensors 116, 117 and 119 along with actuator sensor information (not shown) to generate an applied torque to actuator 111a and 113a to generate an electric pulse width modulated (PWM) signal which is transmitted to the power electronics 125a and 127a. A microcontroller 401 and a time-triggered protocol (TTP) chip 403 are used in the road wheel nodes 125 and 127 to transmit the PWM signal to the power electronics 125*a* and 127*a*. Power electronics 125*a* and 127 receive the PWM signal that directs the current to control the torque generated by the actuators 111*a* and 113*a*, which adjusts or controls the movement of wheels 111 and 113.

Turning to the many different forms of the microcontroller 401, the microcontroller 401 is an processor capable of interfacing with a time-triggered protocol (TTP) chip 403, a vehicle speed sensor 117, a lateral acceleration sensor 115, a yaw rate sensor 119, absolute wheel position sensors 111*b* and 113*b*, a wheel speed sensor 111*c* a or 113*c*, actuator sensors (not shown) and power electronics 125*a* or 127*a*. This hardware device can be a microprocessor, microcontroller or digital signal processor, having an electrically erasable program read only memory (EEPROM) or flash memory and static random access memory (RAM). The microcontroller includes a software algorithm that enables it to continuously monitor and read measurements from all sensors mentioned above and generate an applied torque to adjust or move or rotate the road wheels 111 and 113.

Microcontrollers 301 and 401 interfaces with time triggered protocol (TTP) chips 303 and 403 to exchange messages with other nodes. The TTP (Time-Triggered Protocol) chips 303 and 403 use TDMA (time division multiple access) real-time fault tolerant communication protocol used for real-time distributed control of safety-critical systems. TTP chip 403 is equivalent to TTP chip 303.

Figure 5:
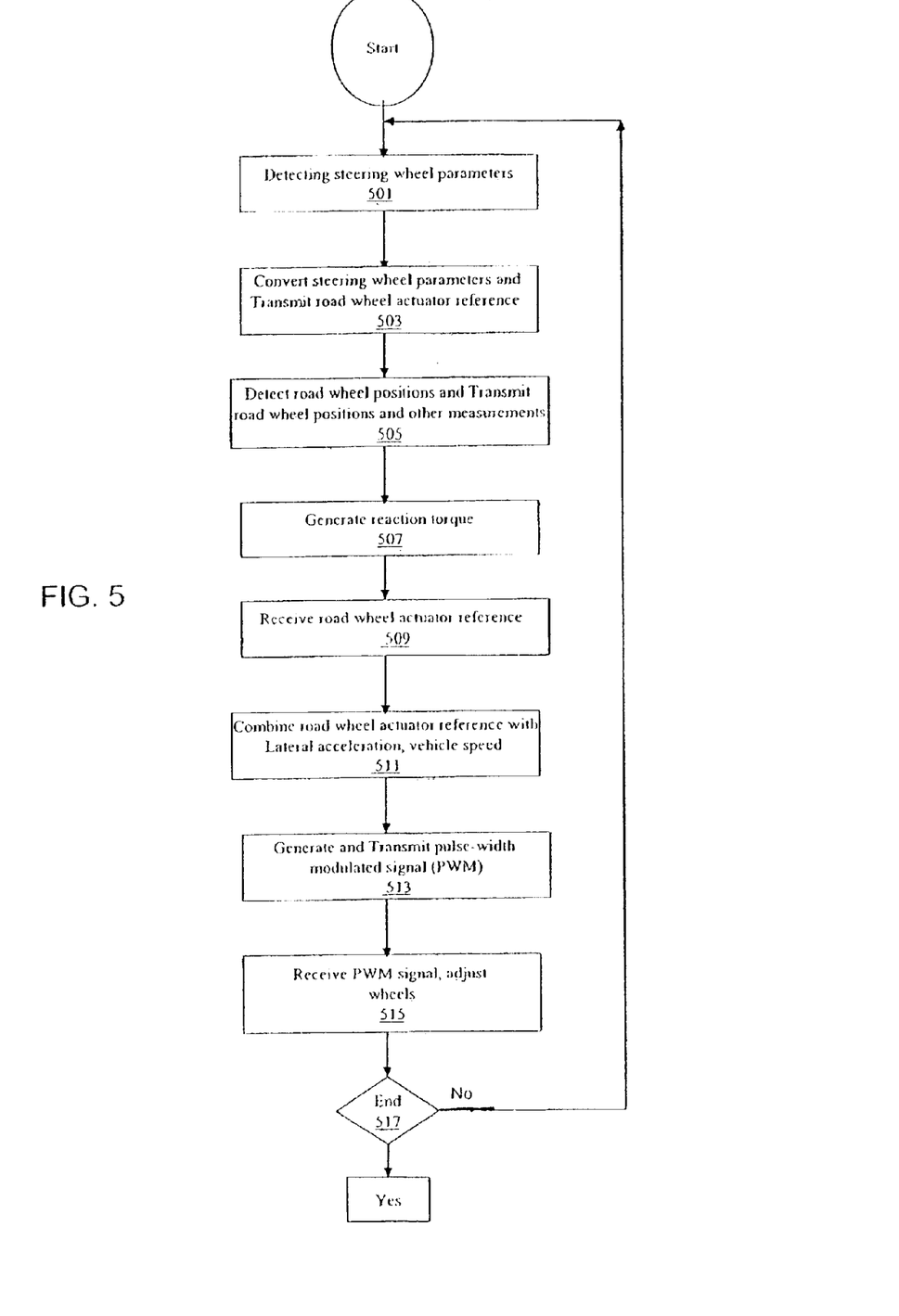
FIG. 5 is a flow chart that depicts a mode of interaction of the driver interface assembly, driver interface nodes, road wheel nodes and the wheels of the vehicle of FIG. 1 in accord with the present invention.

As shown in FIG. 5, the overall operation of the distributed steer-by-wire control system is described as follows. At block 501, driver interface nodes 121 and 123 detect or sense and receive a driver intent when a driver rotates the steering wheel 101*a* or moves a joystick of the vehicle body 100. As stated above the driver intent is referred to as steering wheel parameters or driver interface status, which include a steering wheel angle and steering wheel rate. In addition, driver interface nodes 121 and 123 receive vehicle information from other vehicle systems of the vehicle.

At block 503, driver interface nodes 121 and 123 use microcontroller 301 to convert the driver intent to a road wheel actuator reference that is transmitted through the TTP communication bus or network 110 in a fault-tolerant manner to road wheel nodes 127 and 129. In addition, driver interface nodes 121 and 123 transmit driver interface status and vehicle information through the TTP communication bus 110 in a fault-tolerant manner to the road wheel nodes 125 and 127.

At block 505, road wheel nodes 127 and 129 detect or measure road wheel positions, as described above, and transmit road wheel positions, lateral acceleration and vehicle speed along with other vehicle measurements, which are referred to as measurements from a vehicle body 100 through the TTP communication bus 110, to the microcontroller 301 in driver interface nodes 121 and 123.

At block 507, the microcontroller 301 uses the respective measurements from the road wheel nodes 127 and 129 along with the steering wheel angle component of the steering wheel parameters to generate a steering wheel feed back in the form of the reaction torque discussed above.

At block 509, microcontroller 401 in the road wheel nodes 127 and 129 each receive the road wheel actuator reference via the TTP communication bus 110. Road wheel nodes 125 and 127 sense lateral acceleration form lateral acceleration sensor 115, vehicle speed from vehicle speed sensor 117, yaw rate from yaw rate sensor 119, absolute wheel position from sensors 111*b* and 113*b*, actuator current, actuator position, actuator temperature from actuator sensors (not shown) at actuators 111*a* and 113*a*. Absolute wheel position sensors 111*b* and 113*b* provides the front and left wheel position.

At block 511, microcontroller 401 combines the road wheel actuator reference, sense lateral acceleration form lateral acceleration sensor 115, vehicle speed from vehicle speed sensor 117, yaw rate from yaw rate sensor 119, absolute wheel position from sensors 111*b* and 113*b*, actuator current, actuator position, actuator temperature from actuator sensors (not shown) at actuators 111*a* and 113*a*, which are referred to as sensor measurements from vehicle body 100, to generate an applied torque to actuators 111*a* and 113*a* as described above.

At block 513, road wheel nodes 125 and 127 each use the applied torque to generate a known electrical pulse width (PWM) signal that is transmitted to power electronics 125*a* and 127*a*.

At block 515, power electronics 125*a* and 127*a* receive the PWM signal and amplify this signal in both voltage and current appropriate to drive the actuators 111*a* and 113*a* to adjust the wheels 111 and 113.

At block 517, this algorithm may end or continue at block 501.

It should be noted that the control of this distributed control system is based on time and this time is established by the TTP communication system.

Figure 6:
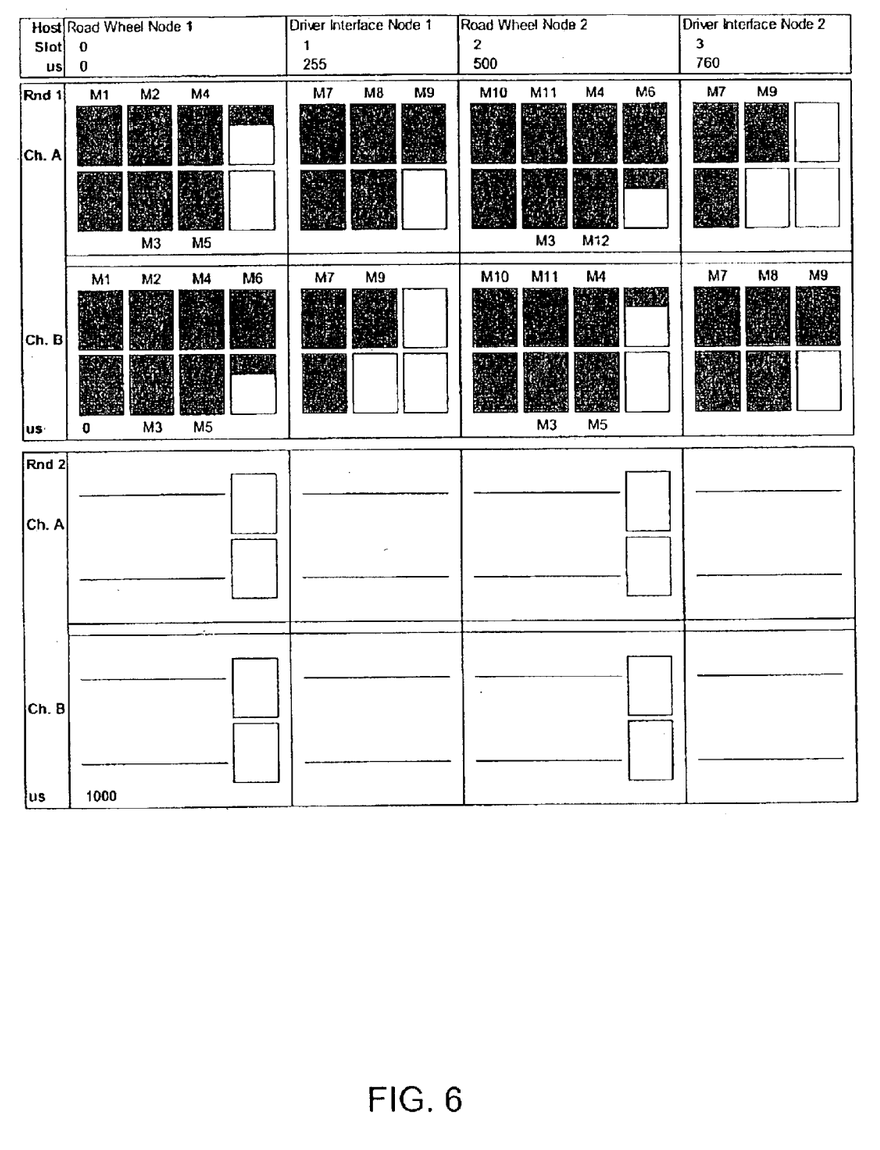
FIG. 6 is a diagram of TTP signals used in the driver interface nodes and road wheel nodes of the vehicle of FIG. 1 in accord with the present invention.

FIG. 6 is a diagram of Time-Triggered Protocol (TTP) signals according to the present invention. This diagram depicts an example of two signals transmitted from driver interface nodes 121 and 123 through the TTP communication bus 110 or TTP communication network 110 to road wheel nodes 125 and 127. TTP communication is based on TDMA (time division multiple access) and each node has a time slot to transmit information. Each node must transmit within their pre-defined time slot. The sequence of node time slots in which each node performs one transmission forms a TDMA communication round. Each driver interface node and each road wheel node must transmit information to form the communication round shown in FIG. 6. Thus, the first signal transmitted between the driver interface nodes 121 and 123 to road wheel nodes 125 and 127 is referred to as a first TDMA communication round. The second signal transmitted between the driver interface nodes 121 and 123 to road wheel nodes 125 and 127 is a second TDMA communication round. This is just one example of communicating information within this distributed steer-by-wire control system.

Turning to the first signal transmitted from the driver interface nodes 121 and 123 and road wheel nodes 125 and 127, this signal is transmitted on two channels A and B by two communication buses from the driver interface nodes 121 and 123 to road wheel nodes 125 and 127. If one channel is lost on a driver interface node or road wheel node, then another channel can be used to transmit the signal on the active driver interface node or road wheel node. In addition, when one signal or message is transmitted from one of the driver interface nodes 121 and 123 to one of the road wheel nodes 125 and 127, then the driver interface nodes 121 and 123 and road wheel nodes 125 and 127 receive the signal or message. The transmission of the signal between the driver interface nodes 103 and 105 and road wheel nodes 125 and 127 operates similar to a telephone line that is available for anyone on the line to hear and speak. For example, when a person calls another person on the telephone line everyone on this telephone line or TTP communication bus is able to receive, hear and speak to the caller.

Turning to the actual signals transmitted between the driver interface nodes 121 and 123 and road wheel nodes 125 and 127, these signals are denoted as M1, M2, M3, M4, M5, M6, M7, M8, M9, M10, M11 and M12. M1 is a front left wheel 111 (FIG. 1) actuator position signal received at road wheel node 125. M2 is a front left wheel 111 speed signal received at road wheel node 125. M3 is a lateral acceleration signal from the lateral acceleration sensor 115 received at road wheel nodes 125 and 127. M4 is a yaw rate signal from the yaw rate sensor 119 received at road wheel nodes 125 and 127. M5 is a front left wheel status,signal from road wheel node 125. M6 is a vehicle speed signal from sensor 106 received at road wheel nodes 125 and 127. M7 is the actuator reference signal that is a calculated from the driver interface nodes 121 and 123. M8 is the vehicle information signal taken from other vehicle systems and received at driver interface nodes 121 and 123. M9 is a driver interface status signal from either driver interface node. M10 is a front right wheel actuator position signal received at road wheel node 127. M11 is a front right wheel speed signal from sensor 113c received at road wheel node 127. M12 is a front right wheel status signal from road wheel node 127.

The M1–M12 message or signals transmitted may be one or two bytes, where one byte indicates it is a smaller message than the two bytes. As stated above all the messages M1–M12 are received from different components in the vehicle 100 and each message may be one or two bytes transmitted among driver interface nodes 121 and 123 and road wheel nodes 125 and 127.

Road wheel nodes 125 and 127 use the M3, M4, M6, and M7 messages in the applied torque equation, described above, to direct the power electronics 121a, 123a, 125a and 127a to force actuators 111a and 113a to adjust or move the wheels 111 and 113 in an angular motion.

From the foregoing, it can be seen that the present invention provides a distributed control system with a time-triggered protocol communication network that controls a steering system for a vehicle. This invention provides the advantage of fault tolerant control system that is failsafe. In addition, the distributed structure makes this system effortless to build and maintain.

While a particular embodiment of the present invention has been shown and described, modifications may be made. It is therefore intended in the appended claims to cover such changes and modifications, which follow in the true spirit and scope of the invention.

We claim:

1. A distributed control system for controlling a steering movement of a vehicle, the system comprising:
   a driver interface assembly;
   a driver interface node having a first time-triggered protocol (TTP) processing system coupled to the driver interface assembly, wherein the driver interface node receives steering wheel parameters from the driver interface assembly;
   a road wheel node having a second time triggered protocol (TTP) processing system coupled to the driver interface node, wherein the road wheel node transmits sensor measurements from a vehicle to the driver interface node; and
   wherein the road wheel node generates an applied torque that adjusts a wheel of the vehicle.

2. The system of claim 1 wherein the driver interface node generates a road wheel actuator reference based on the steering wheel parameters, wherein the driver interface node transmits the road wheel actuator reference to the road wheel node, wherein the road wheel node generates the applied torque based on the road wheel actuator reference.

3. The system of claim 2 wherein the driver interface node generates a reaction torque based on the steering wheel parameters and measurements from the vehicle.

4. The system of claim 2 wherein the road wheel actuator reference is transmitted to the road wheel node in a fault-tolerant manner.

5. The system of claim 4 wherein the fault-tolerant manner comprises a real-time fault-tolerant manner.

6. The system of claim 1 wherein the measurements from the vehicle are transmitted from the road wheel node to the driver interface node in a fault-tolerant manner.

7. The system of claim 1 wherein the driver interface node having the first TTP processing system comprises a microcontroller coupled to a time triggered protocol circuit.

8. The system of claim 7 wherein the microcontroller comprises a microprocessor.

9. The system of claim 7 wherein the microcontroller comprises a digital signal processor.

10. The system of claim 1 wherein the driver interface node is coupled to the road wheel node by a TTP communication bus.

11. The system of claim 1 wherein the road wheel node having the second TTP processing system comprises a microcontroller coupled to a TTP circuit.

12. The system of claim 1 wherein the measurements from the steering wheel parameters comprise measurements of a steering wheel angle.

13. The system of claim 2 wherein the road wheel node generates an electrical pulse width modulated signal.

14. The system of claim 13 further comprising power electronics that receive the electric pulse width modulated signal that moves the wheel of the vehicle.

15. The system of claim 14, wherein the power electronics are operative to control a torque of an actuator.

16. The system of claim 14 wherein the measurements from the vehicle comprises vehicle speed, a lateral acceleration, a yaw rate, an absolute wheel position, an actuator current, an actuator position and an actuator temperature.

17. The system of claim 15, wherein the power electronics are solid-state transistors.

18. The system of claim 15, wherein the actuator adjusts the wheel of the vehicle.

19. The system of claim 3, wherein the generated reaction torque is calculated in accordance with the following equation:

Reaction Torque $k1*$(Steering wheel angle—Road wheel angle)$+ k2*$lateral acceleration $k1=k5*$(vehicle speed$+kv2$)

$k2=k6*$(vehicle speed$+kv3$)

where kv2, kv3, k5 and k6 are positive constant values known for the vehicle, steering wheel angle is a measurement from the steering wheel parameters, road wheel angle is a measurement from the road wheel node, vehiclespeed is measured from the vehicle and lateral acceleration is measured from the vehicle.

20. The system of claim 15, wherein the applied torque is calculated in accordance with the following equation:

Applied Torque$=K*$(road wheel actuator reference—road wheel angle)

$K=k3*$(vehicle speed$+kv1$); if actuator temperature<actuator temperature threshold and actuator current<actuator current threshold, otherwise $K=k3*$(vehicle speed$+kv$)$*(k4/$max($|$current$|, |$temperature$|$))

where k3, k4 & kv1 are positive constants, K is a function of a vehicle speed of the vehicle, road wheel angle is a measurement from the road wheel node, an actuator current of the actuator, an actuator temperature of the actuator, an actuator threshold current and an actuator threshold temperature are measurements stored in the road wheel node.

21. A distributed method for controlling the steering operation of a vehicle, the method comprising:

receiving measurements from a driver interface assembly;

receiving sensor measurements from a vehicle;

combining the received measurements from the driver interface assembly and sensor measurements from the vehicle in an applied torque equation to generate an applied torque; and adjusting a wheel of the vehicle based on the applied torque.

22. The method of claim 21, wherein the measurements from the vehicle, comprise a vehicle speed of the vehicle.

* * * * *

UNITED STATES PATENT AND TRADEMARK OFFICE
CERTIFICATE OF CORRECTION

| | |
|---|---|
| PATENT NO. | : 6,862,507 B2 |
| APPLICATION NO. | : 10/407005 |
| DATED | : March 1, 2005 |
| INVENTOR(S) | : Clifford Altemare, Jr. et al |

It is certified that error appears in the above-identified patent and that said Letters Patent is hereby corrected as shown below:

<u>In the Claims</u>

Column 10, in claim 20, line 8, after "vehicle speed +" delete "kv)" and substitute --kv1)-- in its place.

Signed and Sealed this

Twenty-second Day of August, 2006

JON W. DUDAS
*Director of the United States Patent and Trademark Office*